United States Patent
Vinayagamurthy et al.

(10) Patent No.: US 11,687,665 B2
(45) Date of Patent: Jun. 27, 2023

(54) VERIFIABLE SERVICE PROVIDER PERFORMANCE REGARDING QUERY RESPONSE PROVISION

(71) Applicant: International Business Machines Corporation, Armonk, NY (US)

(72) Inventors: Dhinakaran Vinayagamurthy, Erode (IN); Sandeep Nishad, Lucknow (IN); Dayama Pankaj Satyanarayan, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 17/120,766

(22) Filed: Dec. 14, 2020

(65) Prior Publication Data

US 2022/0188446 A1 Jun. 16, 2022

(51) Int. Cl.
    *G06F 21/62* (2013.01)
    *G06F 21/31* (2013.01)
    *G06F 21/60* (2013.01)
    *G06F 21/64* (2013.01)

(52) U.S. Cl.
    CPC .......... *G06F 21/6227* (2013.01); *G06F 21/31* (2013.01); *G06F 21/602* (2013.01); *G06F 21/64* (2013.01)

(58) Field of Classification Search
    CPC .... G06F 21/6227; G06F 21/31; G06F 21/602; G06F 21/64
    See application file for complete search history.

(56) References Cited

U.S. PATENT DOCUMENTS

| | | | |
|---|---|---|---|
| 8,577,933 B2 | 11/2013 | Evenhaim | |
| 10,348,700 B2 | 7/2019 | Auradkar et al. | |
| 2014/0281572 A1* | 9/2014 | Wang | G06F 21/6254 713/189 |
| 2015/0269495 A1 | 9/2015 | Dalessandro et al. | |
| 2017/0353855 A1* | 12/2017 | Joy | H04W 12/02 |

(Continued)

OTHER PUBLICATIONS

Nicolas Papernot et al., "Semi-Supervised Knowledge Transfer for Deep Learning From Private Training Data", ICLR 2017, 16 pages, ICLR.

(Continued)

*Primary Examiner* — Ayoub Alata
(74) *Attorney, Agent, or Firm* — Ference & Associates LLC (57) ABSTRACT

One embodiment provides a computer implemented method, including: receiving, at a service provider from each of a plurality of data owners each having data accessible to the service provider, a privacy budget, wherein the privacy budget identifies a set of privacy requirements to be employed by the service provider on data of the data owner; receiving, at the service provider, a query from a client; receiving, at the service provider from each of at least a subset of the data owners, a response to the query; adding, by the service provider, noise to each of the responses, wherein an amount of noise added to each response is based upon the privacy budget of the data owner corresponding to a given response; and returning, by the service provider to the client, an aggregated response including the responses having added noise.

20 Claims, 5 Drawing Sheets

(56) References Cited

U.S. PATENT DOCUMENTS

2018/0101697 A1* 4/2018 Rane ................. H04L 9/085
2019/0236306 A1* 8/2019 Ding ................. G06F 11/3466

OTHER PUBLICATIONS

Henry Corrigan-Gibbs et al., "Prio: Private, Robust, and Scalable Computation of Aggregate Statistics", Proceedings of the 14th USENIX Symposium on Networked Systems Design and Implementation (NSDI '17), Mar. 27-29, 2017, Boston, MA, USA, 25 pages, USENIX Association.

Arjun Narayan et al., "Verifiable Differential Privacy", EuroSys '15, Apr. 21-24, 2015, Bordeaux, France, 14 pages, ACM Digital Library.

* cited by examiner

VERIFIABLE SERVICE PROVIDER PERFORMANCE REGARDING QUERY RESPONSE PROVISION

BACKGROUND

The movement of data from local storage to remote storage is becoming more common. Additionally, instead of fully moving the data to remote storage, an entity may simply make the data accessible via a remote storage entity. This is particularly true if the data owner wants the data to be accessible by many different entities and from many different locations. By placing or storing the data with or facilitating access to the data via a storage provider (e.g., cloud service provider, remote service provider, on-premises service provider, etc.), the data owner is able to allow access to the data to any entities that are allowed to access the data from any location. Additionally, by moving the data to or providing access to the data through a service provider, the data owner is also moving some management duties and resource requirements to the service provider. For example, the data owner no longer has to manage the data by responding to query responses by entities accessing the data. Rather, the service provider is responsible for providing responses to any queries.

BRIEF SUMMARY

In summary, one aspect of the invention provides a computer implemented method, including: receiving, at a service provider from each of a plurality of data owners each having data accessible to the service provider, a privacy budget, wherein the privacy budget identifies a set of privacy requirements to be employed by the service provider on data of the data owner; receiving, at the service provider, a query from a client; receiving, at the service provider from each of at least a subset of the data owners, a response to the query; adding, by the service provider, noise to each of the responses, wherein an amount of noise added to each response is based upon the privacy budget of the data owner corresponding to a given response; and returning, by the service provider to the client, an aggregated response including the responses having added noise, thereby allowing verification of the accuracy of query responses and the verification of an amount of noise added by the end-to-end system to query responses for a data owner up to the point of verification through the generation of proofs.

Another aspect of the invention provides an apparatus, including: at least one processor; and a computer readable storage medium having computer readable program code embodied therewith and executable by the at least one processor; wherein the computer readable program code includes code that receives, at a service provider from each of a plurality of data owners each having data accessible to the service provider, a privacy budget, wherein the privacy budget identifies a set of privacy requirements to be employed by the service provider on data of the data owner; wherein the computer readable program code includes code that receives, at the service provider, a query from a client; wherein the computer readable program code includes code that receives, at the service provider from each of at least a subset of the data owners, a response to the query; wherein the computer readable program code includes code that adds, by the service provider, noise to each of the responses, wherein an amount of noise added to each response is based upon the privacy budget of the data owner corresponding to a given response; and wherein the computer readable program code includes code that returns, by the service provider to the client, an aggregated response including the responses having added noise, thereby allowing verification of the accuracy of query responses and the verification of an amount of noise added by the end-to-end system to query responses for a data owner up to the point of verification through the generation of proofs.

An additional aspect of the invention provides a computer program product, including: a computer readable storage medium having computer readable program code embodied therewith, the computer readable program code executable by a processor; wherein the computer readable program code includes code that receives, at a service provider from each of a plurality of data owners each having data accessible to the service provider, a privacy budget, wherein the privacy budget identifies a set of privacy requirements to be employed by the service provider on data of the data owner; wherein the computer readable program code includes code that receives, at the service provider, a query from a client; wherein the computer readable program code includes code that receives, at the service provider from each of at least a subset of the data owners, a response to the query; wherein the computer readable program code includes code that adds, by the service provider, noise to each of the responses, wherein an amount of noise added to each response is based upon the privacy budget of the data owner corresponding to a given response; and wherein the computer readable program code includes code that returns, by the service provider to the client, an aggregated response including the responses having added noise, thereby allowing verification of the accuracy of query responses and the verification of an amount of noise added by the end-to-end system to query responses for a data owner up to the point of verification through the generation of proofs.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
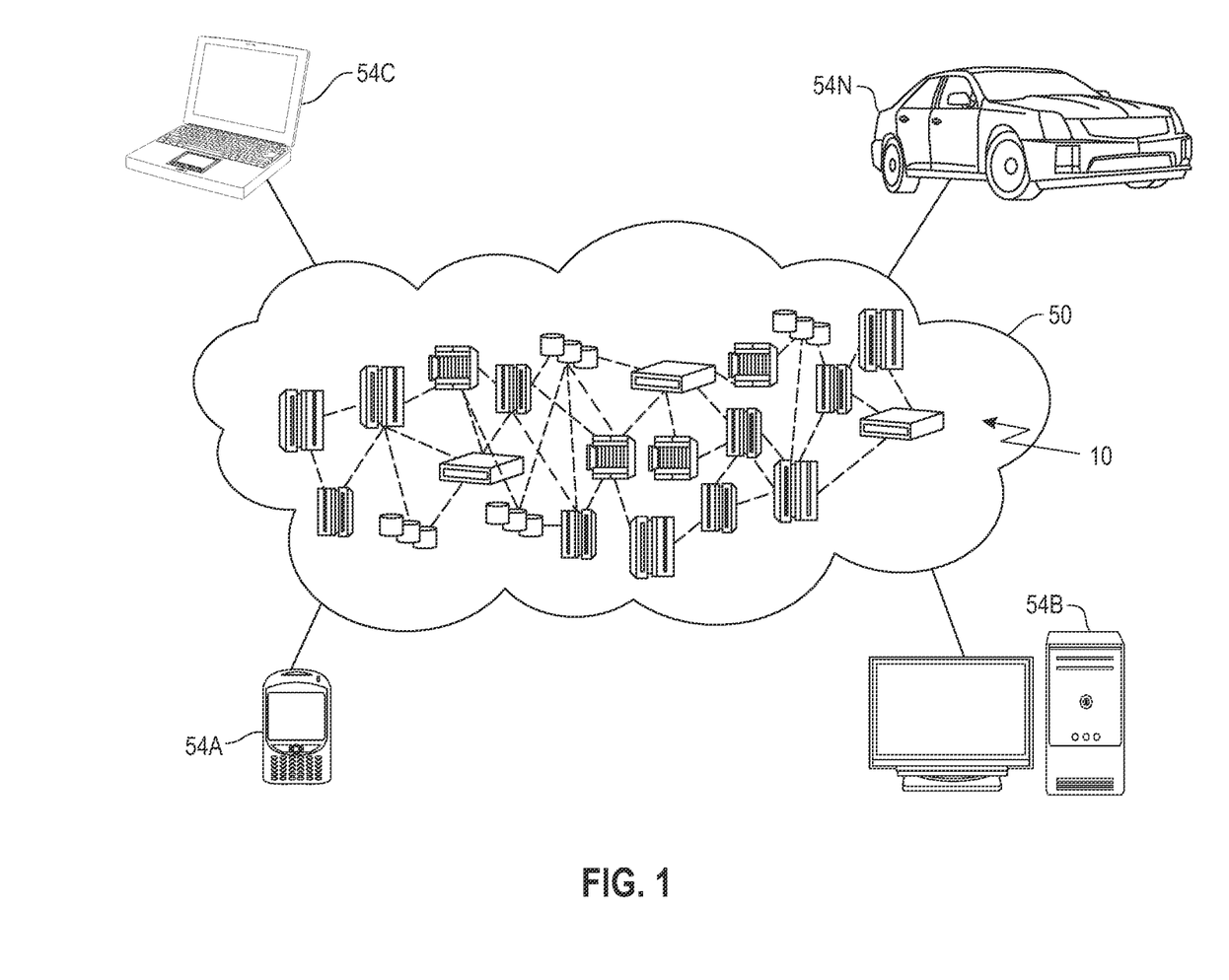
FIG. 1 depicts a cloud computing environment according to an embodiment of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
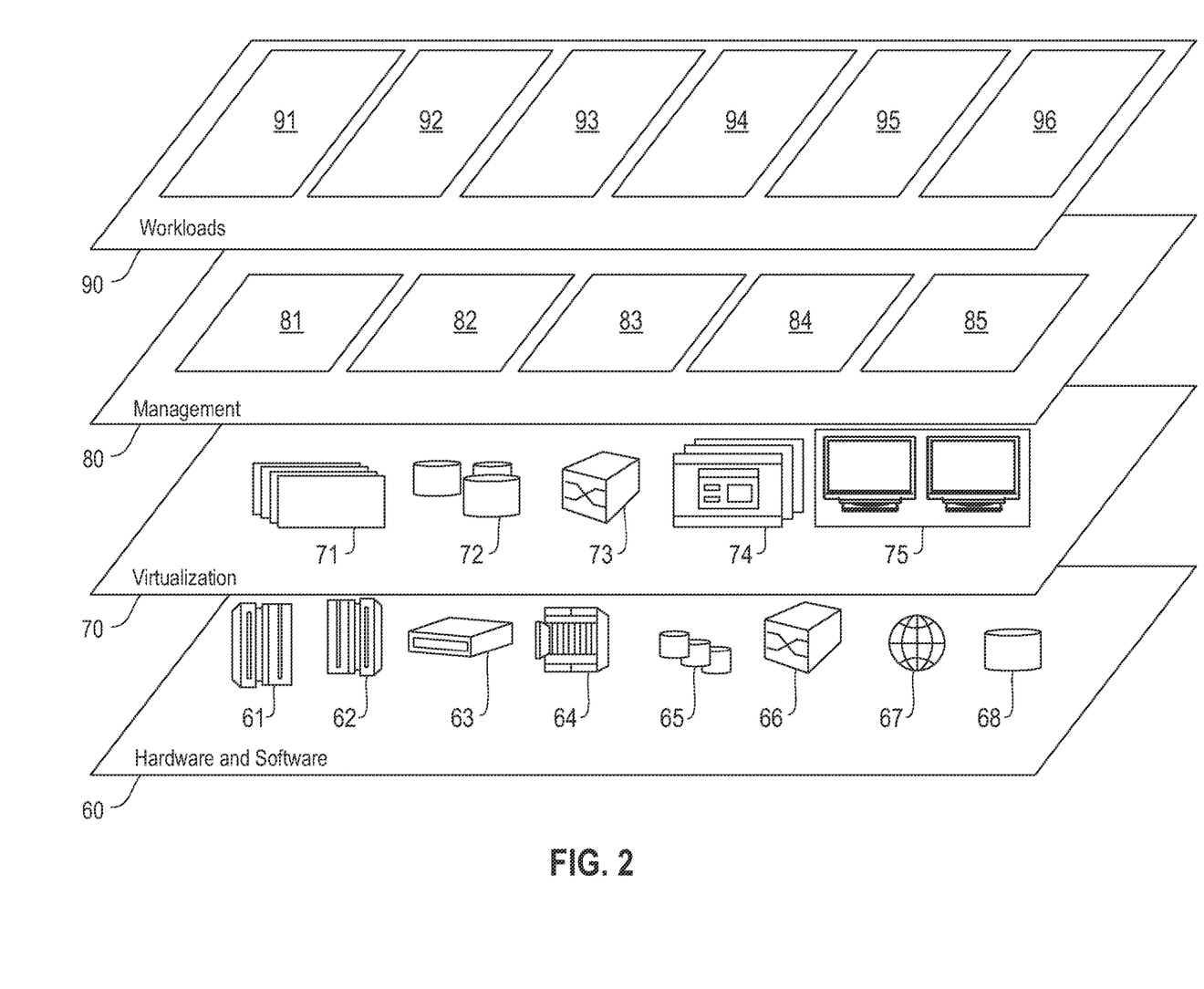
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and service provision 96.

One problem with moving management responsibility to the service provider is that neither the data owner nor the client (i.e., the entity attempting to access the data) can be guaranteed that the service provider is performing as expected. For example, data owners may have data that it would like to keep private and only partially trusts the service provider to keep the data private. In other words, the data owner may have privacy constraints or requirements for the service provider, but does not have a technique for ensuring that the service provider is fulfilling the privacy requirements. As another example, a client is requesting information about the data stored at the service provider through the service provider, but cannot be assured of the accuracy of the data that is being provided from the service provider. In other words, the client cannot be highly confident that the data received from the service provider is accurate.

One technique for ensuring data privacy and accurate results is to use a collection of service providers. The service providers each only manage a portion of the data of the data owner. The service providers then have to collaborate to provide a response to a client query. This technique ensures at least a level of privacy of the data because none of the service providers have enough of the data to learn information about the data. However, splitting of the data between service providers requires the data owner to be more involved in the management of the data, which at least partially defeats one purpose for storing the data at the service provider. Additionally, utilizing more than one service provider is more costly and also requires the service providers to agree to collaborate with other service providers. Other techniques for ensuring privacy require additional entities and results in more complex techniques, thereby increasing the cost associated with utilizing a service provider.

Accordingly, an embodiment provides a system and method for response provision by a service provider, the response being provided based upon a privacy budget of a data owner owning the data utilized in the response and where an accuracy of the response and an amount of noise added to the response can be verified through generated proofs. The system receives from each of a plurality of data owners a privacy budget that identifies a set of privacy requirements or constraints that are to be employed by the service provider on data of the data owner. In other words, each data owner is able to set the level of privacy that should be applied to its own data that is being accessed by the service provider in order to provide query responses. Thus, each data owner may have different privacy requirements than other data owners. Additionally, a single data owner can set different privacy requirements for different datasets being accessed by the service provider.

When the service provider receives a query from a client, the service provider transmits the query to the data owners who provide a response to the query. If a privacy requirement, as identified in the privacy budget, of the data owner indicates that the data of the data should not be included in the query response, the service provider does not receive a response from that data owner with respect to that query. Additionally, or alternatively, the data owner can choose to not respond to a query or provide a noisy response according to a privacy budget that the data owner has set for the service provider. In providing a response to the query, the data owner may add noise to the query response, or decide not to respond to the query, based upon a tunable privacy budget that the data owner has set for itself with respect to the service provider. After receiving the query response from the data owner, which may include noise added by the data owner, the service provider adds noise to each of the individual responses in order to ensure that the privacy requirements for each data owner are met. Since each data owner is able to set its own privacy budget, the amount of noise added to each individual response varies based upon the privacy budget of the respective data owner. The service provider aggregates the responses including the added noise, and provides the aggregated response to the client.

In order to allow the data owner to ensure that the privacy budget was met and allow the client to ensure that the responses provided by the service provider are accurate, the query, individual responses by the data owners, noise added by the service provider, and aggregated response are hashed and the hash is stored within a data repository. From the hashes, the service provider can generate proofs regarding an amount of end-to-end system privacy that was maintained and an accuracy of the responses provided to the client. These proofs can then be accessed and a verification routine can be performed on the proof. The result of the verification routine can then be verified against known information to determine whether the service provider performed as expected.

Such a system provides a technical improvement over current systems for service provider response provision. The described system and method allows for verification of privacy of data maintained by a service provider. Such a technique allows for the use of a semi-trusted service provider, thereby allowing the data owner to save cost by allowing selection of more service providers. Additionally, since the described system and method can be applied to any service provider, the data owner does not have to employ multiple service providers and/or other entities to ensure the privacy of the data is maintained. Furthermore, the described system and method allows for verification of the accuracy of responses to client queries by the service provider. Thus, not only is the privacy of the data ensured, but the client can be assured that the responses that are received from the service provider are accurate, thereby producing a better relationship between the client and service provider. Accordingly, the described system and method provides a more cost efficient data management via service provider technique than traditional systems, but also ensures that both the data owner and client can be assured that even a semi-trusted service provider is performing as expected which is not possible using conventional techniques.

Figure 3:
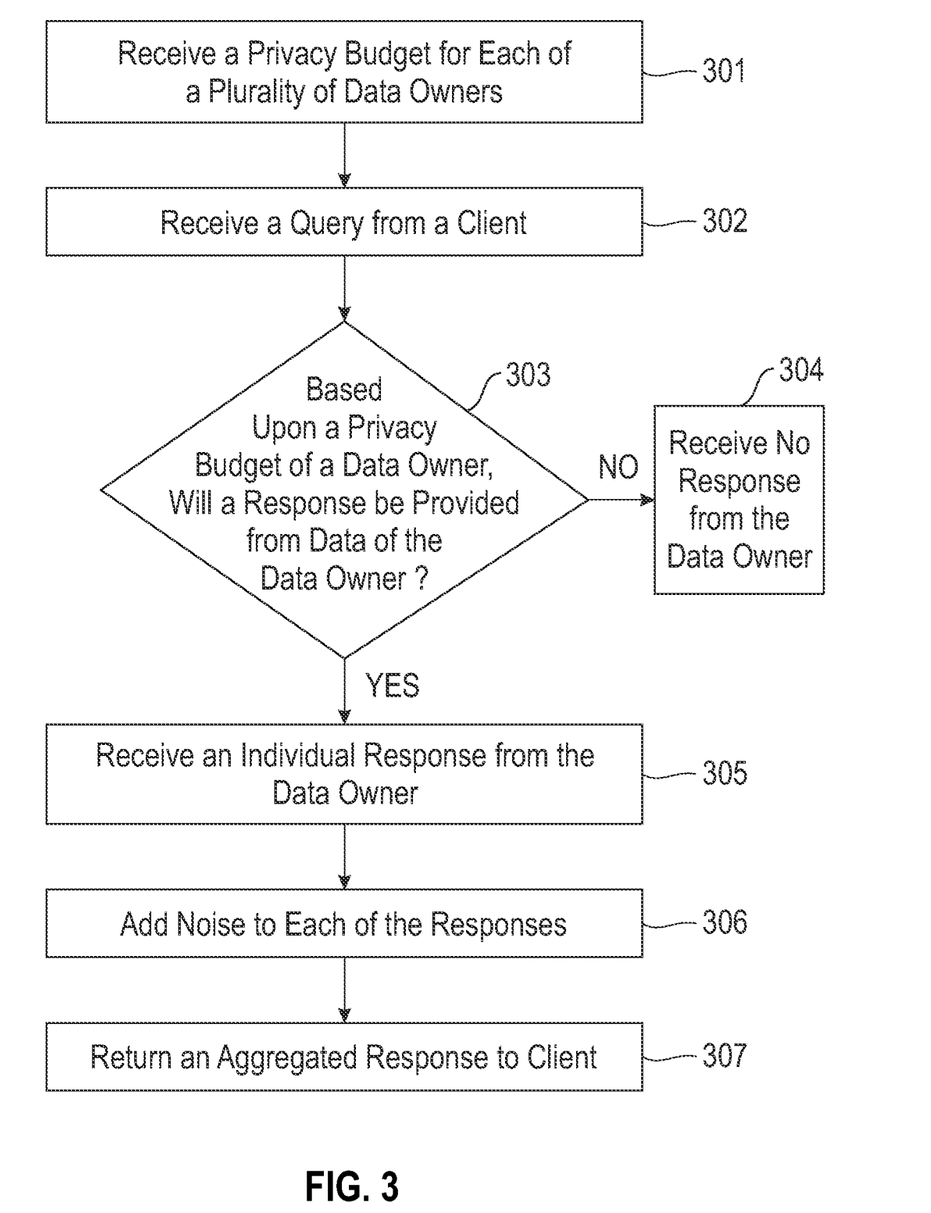
FIG. 3 illustrates a method of response provision by a service provider, the response being provided based upon a privacy budget of a data owner owning the data utilized in the response and where an accuracy of the response and an amount of noise added to the response can be verified through generated proofs.

FIG. 3 illustrates a method for response provision by a service provider, the response being provided based upon a privacy budget of a data owner owning the data utilized in the response and where an accuracy of the response and an amount of noise added to the response can be verified through generated proofs. At 301 a service provider receives a privacy budget from each of a plurality of data owners that have data that is accessible by the service provider. The data may be data that is stored at the service provider, or may be data that is stored by the data owners but where the service provider has access to the data in order to provide responses to client queries. The service provider may be a remote service provider (e.g., cloud service provider, network service provider, etc.) or a local service provider (e.g., on-premise service provider, local network service provider, etc.). Since the described system allows for verification of the performance of the service provider, the service provider does not need to be a completely trusted service provider. Rather, the service provider may be a semi-trusted service provider. The service provider provides services that allow entities other than the data owner to learn information about the data of the data owner. For example, a client may access the service provider to provide queries in order to receive information to train a machine-learning model. Thus, the client wants to ensure that the responses being provided from the service provider are accurate.

The privacy budget identifies a set of privacy requirements to be employed by the service provider on the data of the corresponding data owner. In other words, each data owner may have a desired privacy level or privacy requirements that need to be ensured regarding its data which is identified via the privacy budget. The privacy budget may provide an indication of the types of queries that should be responded to with the data of the data owner. The privacy budget may also provide an indication regarding the amount of noise that should be added to data of the data owner within a response to a query. In other words, to keep the privacy of the data conforming to the privacy requirements of the data owner, the service provider may need to add noise to a response utilizing the data of the data owner.

The privacy budget may be variable, meaning the data owner can change it at any time. Additionally, a data owner may have different privacy budgets for different data that is stored on the service provider. In other words, a single data owner can have different privacy budgets for different data. Additionally, the privacy budgets of one data owner are not reflected in or impacted by privacy budgets of other data owners. In other words, responses received by the service provider from individual data owners may each require different amounts of noise to be added in order to meet the privacy requirements of each individual data owner. Thus, for each individual response, the service provider can maintain the privacy budget of the data owner corresponding to the response.

At 302 the service provider may receive a query from a client. The query can be any type of query or request for information regarding data owned by one or more of the data owners. For example, a client may want to train a machine-learning model over the dataset of the data owners. Since the service provider has access to data from more than one data owner, the service provider can provide responses from across all the data owners. To generate the proofs discussed further herein, the query is hashed and stored, referred to public grounding, within a public data repository, for example, a hash commitment dictionary, or other publically accessible data repository.

At 303 the service provider determines which of the data owners will provide a response to the query. This determination is based upon the privacy budget of the data owner. In other words, a data owner may have privacy requirements, as identified in the privacy budget, that provide an indication that certain queries should not be responded to using data of the data owner. Thus, if the privacy budget of a particular data owner indicates that the query received at 302 should not be responded to using data of the data owner, either any data of the data owner or data from one or more particular datasets, the service provider may receive no response from that data owner at 305. Alternatively, if the privacy requirements preventing a response only apply to a subset of the data of the data owner, the service provider may only receive a partial response to the query from the data owner, where the partial response only includes data from datasets that are not constrained by the privacy requirements. Additionally, or alternatively, each data owner may have its own privacy budget with respect to the service provider. Accordingly, the data can choose to not respond to the query or may provide a noisy response according to the privacy budget it has set for the service provider. In other words, each data owner can set a tunable privacy budget for itself with respect to the service provider. Accordingly, when the data owner receives the query and provides a response, the data owner may add noise to the response based upon a tunable privacy budget that the data owner has set for itself with respect to the service provider. Based upon this tunable privacy budget, the data owner may also decide not to response to the query at all instead of providing a response and/or a noisy response.

On the other hand, if the privacy budget of the data owner does not restrict the response to the query received at 302, the service provider may receive an individual response from the data owner at 305. An individual response means that the response received is not aggregated with a response from another data owner. Since some of the data owners may not provide a response to the query, the responses may be received from only a subset of the data owners. Alternatively, all of the data owners may provide a response and, therefore, the received responses will be from all the data owners. Thus, the data owners included in the group providing a response are determined based upon the privacy budget corresponding to each of the data owners. The individual responses may be hashed and stored within the public data repository.

At 306 the service provider adds noise to the each of the individual data owner responses. The noise added by the service provider may be in addition to any noise added by the data owner when providing a response to the query to the service provider. The amount of noise that is added is based upon the privacy budget of the data owner providing the response. Thus, the amount of noise could be equal to zero in the case where the data owner does not have any privacy constraints for the individual response. In order to ensure that the amount of noise added fulfills the privacy budget of the individual data owners, the described system provides a technique for verifying the amount of noise added. To this end, random coins are set up for each individual data owner to be utilized by the service provider. To set up the random coins, each data owner generates a random bit string with a hash. Each data owner sets up a distribution of random coins that can be accessed by the service provider. When the service provider generates a response with added noise, referred to as a noisy response for ease of readability, the service provider computes a randomness based upon the random bit string from one of the random coins within the distribution corresponding to the data owner providing the response. The noisy responses are also hashed and stored on the public data repository.

Additionally, the service provider generates a knowledge proof that the response is computed from the random string using the hash belonging to the data owner. This knowledge proof can be used by to verify the accuracy of the response, referred to as the accuracy proof to distinguish from the noise proof. This knowledge proof has access to the query, responses, and the noise added by the service provider. The knowledge proof also takes input from the public data repository. Thus, the knowledge proof has public input (e.g., the query, the hash and signature for each of the data owners, noise hash, aggregated response hash, etc.) and private input (e.g., individual responses, the aggregated response, the added noise, etc.). The aggregated response may be made public if the client wants to verify the proof. This proof can then be verified by any verification entity using a verification routine.

The verification routine for verifying the accuracy proof may include the service provider reading the public input of the accuracy proof using the hash of the query that was stored in the public data repository as the key for reading the proof. From the reading of the proof, the service provider provides proof that the function of the aggregate response is a function of the individual responses each having an added amount of noise. The service provider also provides proof that the hash of the response within the proof matches the hash of the proof stored in the public data repository. The service provider also provides proof that for each response included in the aggregated response the hash used to generate the noise for that response matches the hash corresponding to each individual data owner. Finally, the service provider provides proof that the hash of the noise within the proof matches the hash of the noise stored in the public data repository. Any verifier can run the verification routine to verify the proof and can verify the signatures within the proof match the data owner signatures. Additionally, since the verification routine can be run outside the proof generation process, the efficiency of the verification can be significantly improved.

Once the individual responses are received and an appropriate amount of noise is added to each response per the privacy budget of the individual data owner, the service provider returns an aggregated response to the client at 307. The aggregated response is an aggregation of the noisy responses (i.e., the responses having added noise) generated at 306. The aggregated response is also hashed and stored within the public data repository. All of the hashes that are stored (e.g., query hash, individual response hashes, noise hashes, aggregated response hash, etc.) may be committed as key-value pairs in the public data repository. In one example, the key of the key-value pairs may be the hash of the query and the value may be the list of the other hashes. These can be appended within the data repository but may not be modified, for example, like in a block chain implementation.

To verify an amount of noise that is added in the end-to-end system, the service provider generates a second proof, referred to as a noise proof to differentiate from the accuracy proof. The noise proof is used to prove that the amount of noise added by the system matches the privacy budget of the respective data owner. It should be noted that this proof can be used to prove the privacy guarantees of the end-to-end system after multiple queries have been responded to by the service provider. In other words, the noise proof allows a verifier to determine that the complete or end-to-end system has achieved the claimed level of differential privacy for all the queries that have been answered by the system up to the point of verification. Thus, this is not for each individual query, but rather the aggregate of all queries that have been answered by the system up to the point of verification.

The noise proof, like the accuracy proof, is generated utilizing the random bit string or the random coin corresponding to the respective data owner. The noise proof can access the noise sampler for distribution using the random coins of the data owners. The privacy mechanism takes the queries, individual responses from each data owner, and noise, to produce the aggregated response. The proof utilizes public information (e.g., the public data repository, query, claimed differential privacy of the system, etc.). The proof also uses private information (e.g., individual responses, aggregated responses, noise, etc.). This proof can then be verified by any verification entity using a verification routine.

The verification routine for verifying the noise proof may include the service provider reading the public input of the noise proof using the hash of the query as the key for reading the public input. From reading the noise proof, the service provider provides proof that the aggregated response satisfies the claimed differential privacy of the system by proving that the noise is sampled correctly from the distribution using the random coins of the individual data owners and that the privacy mechanism satisfies the claimed differential privacy of the system. The noise proof may also utilize information from the accuracy proofs that proves each element in the aggregated response is accurate. The service provider also provides proof that the response hash computed from the proof matches the response hash included in the public data repository. The service provider also provides proof that the hash for each individual response computed from the proof matches the hash belonging to the data owner included in the public data repository. The service provider also provides proof that the hash for the noise computed from the proof matches the noise hash included in the public data repository. As with the accuracy proof, any verifier can run the verification routine to verify the proof and can verify the signatures within the proof match the data owner signatures. Additionally, since the verification routine can be run outside the proof generation process, the efficiency of the verification can be significantly improved.

Figure 4:
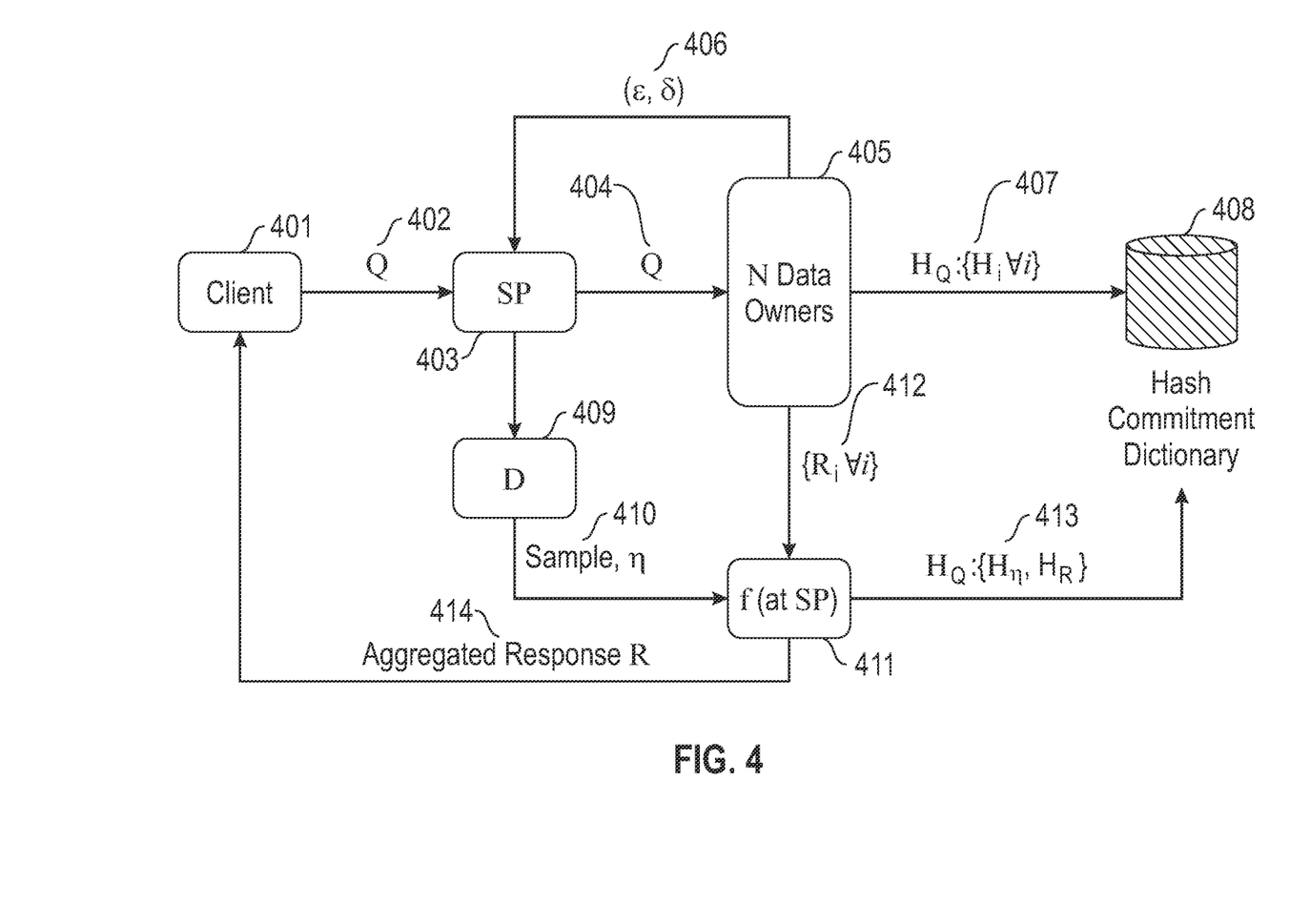
FIG. 4 illustrates an overall system architecture of generating a response to a client query.

FIG. 4 illustrates an overall system architecture for generating a response. The client 401 provides a query 402 to a service provider 403. The service provider 403 passes the query 404 to the individual data owners 405 having data on the service provider 403. Each data owner 405 provides a response to the query 406 back to the service provider 403. Additionally, each data owner 405 hash the individual query 407 and stores it in the hash commitment dictionary 408. The service provider 403 utilizes random coins of the data owner from the random coin distribution 409 to generate noise 410 to be added to the individual response of the data owner. The service provider 403 utilizes a function 411 that adds the noise 410 to the individual response 412 to generate an aggregated response 414 to be provided to the client 401. A hash of the aggregated response 413 is generated and stored in the hash commitment dictionary 408.

Figure 5:
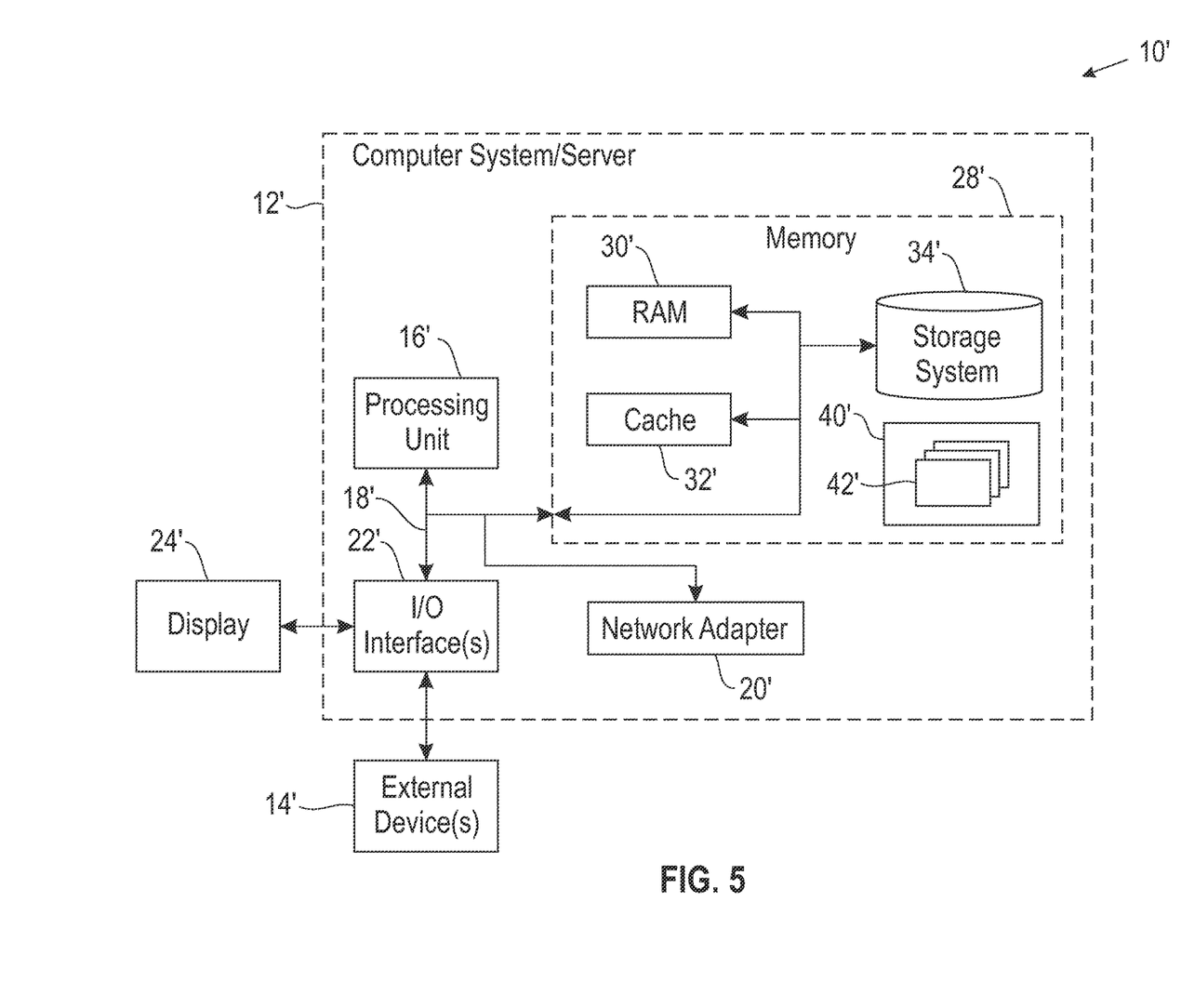
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
receiving, at a service provider from each of a plurality of data owners each having data accessible to the service provider, a privacy budget, wherein the privacy budget identifies a set of privacy requirements to be employed by the service provider on data of a data owner of the plurality of data owners;
receiving, at the service provider, a query from a client;
receiving, at the service provider from each of at least a subset of the plurality of data owners, a response to the query;
adding, by the service provider, noise to each of the responses, wherein an amount of noise added to each response is based upon the privacy budget of a data owner of the at least subset of the plurality of data owners corresponding to a given response; and
returning, by the service provider to the client, an aggregated response comprising the responses having added noise.

2. The computer implemented method of claim 1, wherein data owners within the at least subset of the plurality of data owners are determined based upon the privacy budget corresponding to each of the plurality of data owners.

3. The computer implemented method of claim 1, wherein a hash generated for each of: the query, each of the responses, the noise added to each of the responses, and the aggregated response, are stored within a public data repository.

4. The computer implemented method of claim 3, wherein the stored hashes are utilized in verifying at least one of: an amount of noise added by the service provider and an accuracy of a response provided by the service provider.

5. The computer implemented method of claim 4, wherein the verifying comprises running a verification routine on a stored proof and verifying a signature within the stored proof belongs to a hash, derived from the verification of the stored proof, for a data owner of the plurality of data owners corresponding to the signature.

6. The computer implemented method of claim 1, wherein the noise added to a given response is based upon a random bit string generated by a respective data owner of the subset of the plurality of data owners.

7. The computer implemented method of claim 1, comprising generating a noise proof proving an amount of noise added to responses for a data owner of the subset of the plurality of data owners matches the privacy budget of a respective data owner of the subset of the plurality of data owners, wherein the proof is generated utilizing a random bit string corresponding to the respective data owner.

8. The computer implemented method of claim 6, comprising generating an accuracy proof corresponding to an accuracy of a given response having added noise, wherein the proof is generated utilizing the random bit string corresponding to the respective data owner having added noise.

9. The computer implemented method of claim 1, wherein the privacy budget for each of the plurality of data owners is variable across data owned by a data owner of the plurality of data owners and accessible by the service provider.

10. The computer implemented method of claim 1, wherein the service provider comprises a cloud service provider.

11. An apparatus, comprising:
at least one processor; and
a computer readable storage medium having computer readable program code embodied therewith and executable by the at least one processor;
wherein the computer readable program code comprises code that receives, at a service provider from each of a plurality of data owners each having data accessible to the service provider, a privacy budget, wherein the privacy budget identifies a set of privacy requirements to be employed by the service provider on data of a data owner of the plurality of data owners;
wherein the computer readable program code comprises code that receives, at the service provider, a query from a client;
wherein the computer readable program code comprises code that receives, at the service provider from each of at least a subset of the plurality of data owners, a response to the query;
wherein the computer readable program code comprises code that adds, by the service provider, noise to each of the responses, wherein an amount of noise added to each response is based upon the privacy budget of a data owner of the at least subset of the plurality of data owners corresponding to a given response; and
wherein the computer readable program code comprises code that returns, by the service provider to the client, an aggregated response comprising the responses having added noise.

12. A computer program product, comprising:
a computer readable storage medium having computer readable program code embodied therewith, the computer readable program code executable by a processor;
wherein the computer readable program code comprises code that receives, at a service provider from each of a plurality of data owners each having data accessible to the service provider, a privacy budget, wherein the privacy budget identifies a set of privacy requirements to be employed by the service provider on data of a data owner of the plurality of data owners;
wherein the computer readable program code comprises code that receives, at the service provider, a query from a client;
wherein the computer readable program code comprises code that receives, at the service provider from each of at least a subset of the plurality of data owners, a response to the query;
wherein the computer readable program code comprises code that adds, by the service provider, noise to each of the responses, wherein an amount of noise added to each response is based upon the privacy budget of a data owner of the at least subset of the plurality of data owners corresponding to a given response; and
wherein the computer readable program code comprises code that returns, by the service provider to the client, an aggregated response comprising the responses having added noise.

13. The computer program product of claim 12, wherein data owners within the at least subset of the plurality of data owners are determined based upon the privacy budget corresponding to each of the plurality of data owners.

14. The computer program product of claim 12, wherein a hash generated for each of: the query, each of the responses, the noise added to each of the responses, and the aggregated response, are stored within a public data repository.

15. The computer program product of claim 14, wherein the stored hashes are utilized in verifying at least one of: an amount of noise added by the service provider and an accuracy of a response provided by the service provider.

16. The computer program product of claim 15, wherein the verifying comprises running a verification routine on a stored proof and verifying a signature within the stored proof belongs to a hash, derived from the verification of the stored proof, for a data owner of the plurality of data owners corresponding to the signature.

17. The computer program product of claim 12, wherein the noise added to a given response is based upon a random bit string generated by a respective data owner of the subset of the plurality of data owners.

18. The computer program product of claim 12, comprising generating a noise proof proving an amount of noise added to responses for a data owner of the subset of the plurality of data owners matches the privacy budget of a respective data owner of the subset of the plurality of data owners, wherein the proof is generated utilizing a random bit string corresponding to the respective data owner.

19. The computer program product of claim 17, comprising generating an accuracy proof corresponding to an accuracy of a given response having added noise, wherein the proof is generated utilizing the random bit string corresponding to the respective data owner having added noise.

20. The computer program product of claim 12, wherein the privacy budget for each of the plurality of data owners is variable across data owned by a data owner of the plurality of data owners and accessible by the service provider.

* * * * *